United States Patent [19]
Oomori

[11] Patent Number: 5,551,596
[45] Date of Patent: Sep. 3, 1996

[54] PARTS FEEDING APPARATUS FOR SELECTIVELY FEEDING PARTS OF DIFFERENT TYPES

[75] Inventor: Shigenori Oomori, Toyama-ken, Japan

[73] Assignee: YKK Corporation, Tokyo, Japan

[21] Appl. No.: 316,497

[22] Filed: Sep. 30, 1994

[30] Foreign Application Priority Data

Oct. 13, 1993 [JP] Japan .................................... 5-255628

[51] Int. Cl.⁶ .............................. B65G 59/06; G07F 11/54
[52] U.S. Cl. .......................... 221/113; 221/105; 221/132; 221/178; 221/197
[58] Field of Search ............................ 221/92, 104, 105, 221/113, 132, 178, 197

[56] References Cited

U.S. PATENT DOCUMENTS

| | | | |
|---|---|---|---|
| 2,104,523 | 1/1938 | Lichtenstein | 221/197 |
| 3,090,521 | 5/1963 | Fazekas | 221/197 X |
| 4,456,148 | 6/1984 | Newman et al. | 221/132 |
| 5,242,080 | 9/1993 | Kroon et al. | 221/113 |
| 5,261,564 | 11/1993 | Yelvington | 221/113 |
| 5,280,845 | 1/1994 | Leight | 221/197 X |

FOREIGN PATENT DOCUMENTS 3273469 12/1991 Japan .................................. 221/197 X

*Primary Examiner*—William E. Terrell
*Assistant Examiner*—Dean A. Reichard
*Attorney, Agent, or Firm*—Hill, Steadman & Simpson

[57] ABSTRACT

A parts feeding apparatus includes a plurality of cassettes respectively holding therein rows of parts of different types and removably attached to a plurality of parts supply openings arranged at predetermined angular intervals along the peripheral edge of a rotating circular plate. The circular plate is intermittently rotatable so that a selected one of the parts supply openings and the cassette attached thereto are positioned relative to the inlet opening of a parts delivery chute. An open lower end of the cassette is opened and closed at predetermined time intervals by a reciprocating slide plate member disposed in a parts supply unit. The parts feeding apparatus thus constructed is compact in size and simple in construction. Since the cassettes are arranged on the same circumference on the circular plate, the parts to be fed can be automatically and smoothly changed or switched from one type to another. Thus, the apparatus is readily adaptable to the production of articles of different types to be manufactured in relatively small lots or in relatively large lots.

5 Claims, 5 Drawing Sheets

PARTS FEEDING APPARATUS FOR SELECTIVELY FEEDING PARTS OF DIFFERENT TYPES

BACKGROUND OF THE INVENTION

1. Field of the Invention

The present invention relates generally to a parts feeding apparatus used in connection with application of parts varying in type depending on the type of products to which the parts are to be applied, and capable of automatically changing or switching the parts from one type to another according to a production control procedure or system. More particularly, the present invention relates to a parts feeding apparatus particularly suitable for use in the production of a wide variety of articles produced in relatively small lots.

2. Description of the Prior Art

There have been proposed various parts feeding apparatus suitable for use in the production of various articles produced in small lots. One such apparatus disclosed, for example, in Japanese Patent Laid-open Publication No. 3-57402 is designed to feed sliders for slide fasteners. The disclosed apparatus comprises a slider inventory unit including a plurality of guide rails arranged in parallel to one another, each releasably holding thereon rows of sliders of a different type, a slider conveying unit for capturing and conveying sliders one at a time from a selected one of the guide rails, and a slider guide unit for receiving the sliders conveyed one at a time from the slider conveying unit. The sliders received in the slider guide unit are conveyed one by one to a slider applying machine.

Another parts feeding apparatus disclosed, for example, in Japanese Utility Model Laid-open Publication No. 3-41710 includes a plurality of parts feed chutes arranged horizontally in parallel to one another. The chutes have respective downstream ends pivotally movable, as a single unit, in the same plane so that they come to communicate with a parts supplying holder to feed parts of different types selectively to the parts supplying holder.

In the parts feeding apparatus disclosed in the aforesaid Japanese Patent Laid-open Publication No. 3-57402, a plurality of rows of sliders of different types are stocked in parallel to one another with all the sliders in each row being of the same type. Accordingly, as the number of the type of sliders to be fed increases, the necessary space for installation of the rails increases. In addition, from the inventory unit to the guide unit, the sliders are conveyed one by one by a mechanical means. It is difficult to speed up the conveying speed by using such a mechanical conveying means, which further require a mechanism extremely complicated in construction.

On the other hand, the case of the parts feeding apparatus disclosed in the aforesaid Japanese Utility Model Laid-open Publication No. 3-41710, the number of the chutes increases with an increase in number of the type of parts to be fed. With an increase in number of the chutes, the over-all width of pivotal movement of the parallel juxtaposed chutes is necessarily enlarged. Accordingly, when the downstream end of each chute come to communicate with the parts applying holder, the chutes and the parts supplying holder form a great crossed axes angle with the result that smooth delivery of the parts from the chute to the parts supplying holder cannot be achieved. In view of this difficulty, only a limited small number of chutes can be used. Accordingly, the disclosed parts feeding apparatus appears to be unsuitable for supplying a wide variety of parts.

Furthermore, neither of the conventional apparatus described above is adaptable to the production of articles to be manufactured in relatively large lots.

SUMMARY OF THE INVENTION

With the foregoing difficulties in view, it is an object of the present invention to provide a parts feeding apparatus which is capable of selectively feeding parts of different types smoothly and efficiently, which is simple in construction and can be installed is a relatively small space, and which is suitable for the production of a wide variety of products to be manufactured in relatively small lots.

Another object of the present invention is to provide a parts feeding apparatus which is readily adaptable to the feeding of parts in relatively large lots.

A parts feeding apparatus of the present invention for selectively feeding parts of desired types and number to a subsequent processing station is composed of a parts inventory unit and a chute unit. The parts inventory unit includes a rotating circular plate having a plurality of parts supply openings arranged on the same circumference and intermittently rotatable in a horizontal plane to selectively index the desired parts supply openings, and a plurality of parts stocking cassettes storing respectively therein rows of parts of different types and removably attached to corresponding ones of the parts supply openings in such a manner that the parts in each of the parts stocking cassettes can be discharged from the cassette successively one at a time. The chute unit includes a parts delivery chute mounted fixedly and having an inlet opening facing a portion of the circumference so that the parts supply openings in the rotating circular plate can selectively come to communicate with the inlet opening of the parts delivery chute in response to intermittent rotation of the rotating circular plate.

The parts inventory unit may further include a second cassette fitted in at least one of the parts supply openings for use in combination with a parts feeder. The second cassette is connectable with a discharge guide member of the parts feeder. The parts inventory unit preferably includes a slide member slidably disposed over each of the parts supply openings and normally urged in a first direction to close the corresponding parts supply opening. The slide member has a parts discharge opening normally held out of alignment with the parts supply opening, the parts discharge opening being aligned with and hence communicating with the parts supply opening when the slide member is displaced in a second direction opposite to the first direction. According to a preferred embodiment, the slide member is reciprocated in the first and second directions by means of a cylinder actuator mounted fixedly and having an engagement portion provided on the outer end of its piston rod, and the slide member has an arcuate engagement groove extending concentrically with an axis of rotation of the rotating circular plate, so that the engagement groove is automatically brought into interlocking engagement with the engagement portion of the cylinder actuator when the rotating circular plate rotates intermittently. Preferably, each of the parts stocking cassettes is composed of a hollow tubular member having a discharge opening at one end and including a guide portion extending longitudinally of the tubular member for guiding therealong the parts in stacking condition, and a gate member movably mounted in the tubular member adjacent to the discharge opening for opening and closing the discharge opening of the tubular member.

In the operation of the parts feeding apparatus, the type of parts to be fed in the next cycle of operation is determined based on production control data stored in a control unit. Upon determination of the desired type of the parts, the control unit supplies a signal to an index mechanism of the rotating circular plate to turn the circular plate until one of the parts supply openings, which is fitted with the cassette holding therein the parts of the desired type, is aligned with an inlet opening of the parts delivery chute. When the parts supply opening and the chute's inlet opening are aligned with each other, the circular plate is locked in position against rotation.

During the angular movement of the circular plate, the arcuate engagement groove formed at an end of the slide member is automatically brought into interlocking engagement with the engagement portion of the piston rod of the cylinder actuator mounted fixedly on a body of the apparatus. When this interlocking engagement takes place, the cylinder actuator is driven to contract the piston rod by a predetermined distance so as to displace the slide member until the parts discharge opening in the slide member is located directly below the parts stacked in the cassette. In this instance, the part which is located next to the lowermost part is resiliently forced by a portion of the slide member against the guide portion of the cassette so as not to fall by gravity down from the cassette. On the other hand, the lowermost part is allowed to fall by gravity down from the parts discharge opening. The discharged lowermost part is subsequently guided by the parts delivery chute located in communication with the parts supply opening and finally delivered from the parts delivery chute to a subsequent processing station.

Thereafter, when a predetermined period of time expires, the cylinder actuator is driven to extend its piston rod to return the slide member to its initial position and release a pressure applied from the portion of the slide member to the second lowermost part. Then, the parts stacked in the cassette fall by a distance equal to the thickness or height of each individual part. In this instance however since the slide member is disposed in its initial position, the parts discharge opening in the slide member is held out of alignment with the parts with the result that the parts are all retained in the cassette. Thus, by repeating the foregoing cycle of operation of the cylinder actuator at predetermined time intervals, the parts stacked in the cassette are supplied one by one at predetermined time intervals to the parts delivery chute and subsequently delivered from the parts delivery chute to the subsequent processing station.

When the parts are fed in a certain quantity or lot which is preset in the control unit, the rotating circular plate is rotated through a predetermined angle until a cassette holding therein parts of a different type to be fed in the next cycle of operation is disposed directly above the inlet opening of the parts delivery chute. Subsequently, the foregoing sequence of operation is repeated so as to feed the parts successively at predetermined time intervals to the subsequent processing station.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION OF THE PREFERRED EMBODIMENTS

Figure 1:
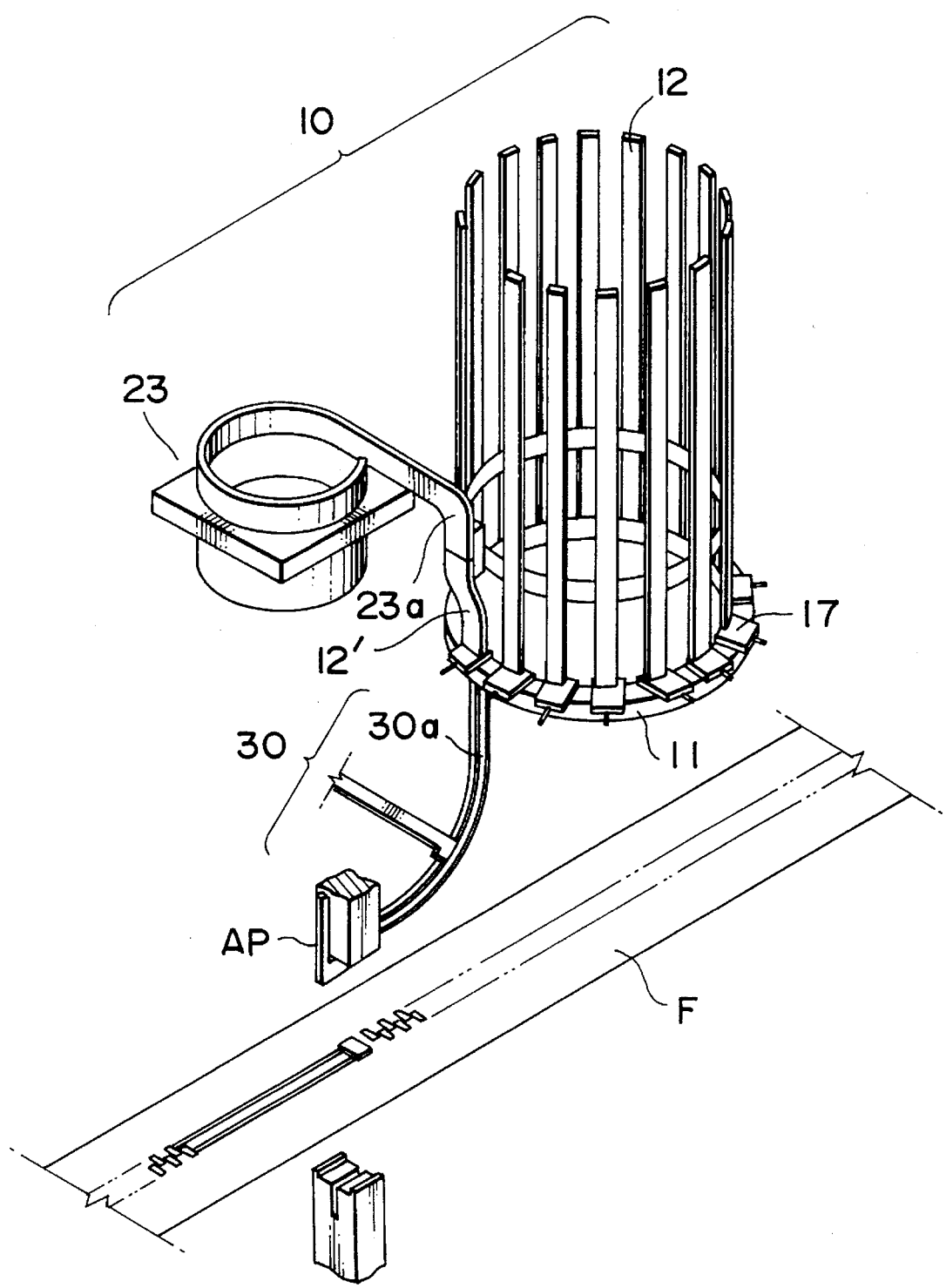
FIG. 1 is a schematic perspective view of a parts feeding apparatus according to the embodiment of the present invention as it is applied to the feeding of bottom end stops of slide fasteners.

Referring now to the drawings, the typical embodiment of this invention will be now described in detail with reference to the drawings. FIG. 1 shows a parts feeding apparatus of the present invention which is so designed as to feed bottom end stops of slide fasteners F.

The parts feeding apparatus comprises a parts inventory unit 10 and a chute unit 30. The parts inventory unit 10 includes a rotating circular plate 11 having a plurality of parts supply openings 11a (FIG. 2) formed along an outer peripheral edge of the rotating circular plate 11 at predetermined angular intervals. The rotating circular plate 11 is intermittently rotatable about a vertical central axis to selectively index the parts supply openings 11a. The parts inventory unit 10 further includes a plurality of parts stocking cassettes 12 respectively holding therein a plurality of rows of parts (bottom end stops) of different types and removably attached to corresponding ones of the parts supply openings 11a in such a manner that the parts P in each off the cassettes 12 can be discharged one by one from a lower end of the cassette 12. The chute unit 30 includes a parts delivery chute 30a fixedly mounted on a body of the parts feeding apparatus and having at its upper end a parts inlet opening 30b (FIG. 3) facing a portion of the circumference on which the parts supply openings 11a in the rotating circular plate 11 are arranged.

Figure 2:
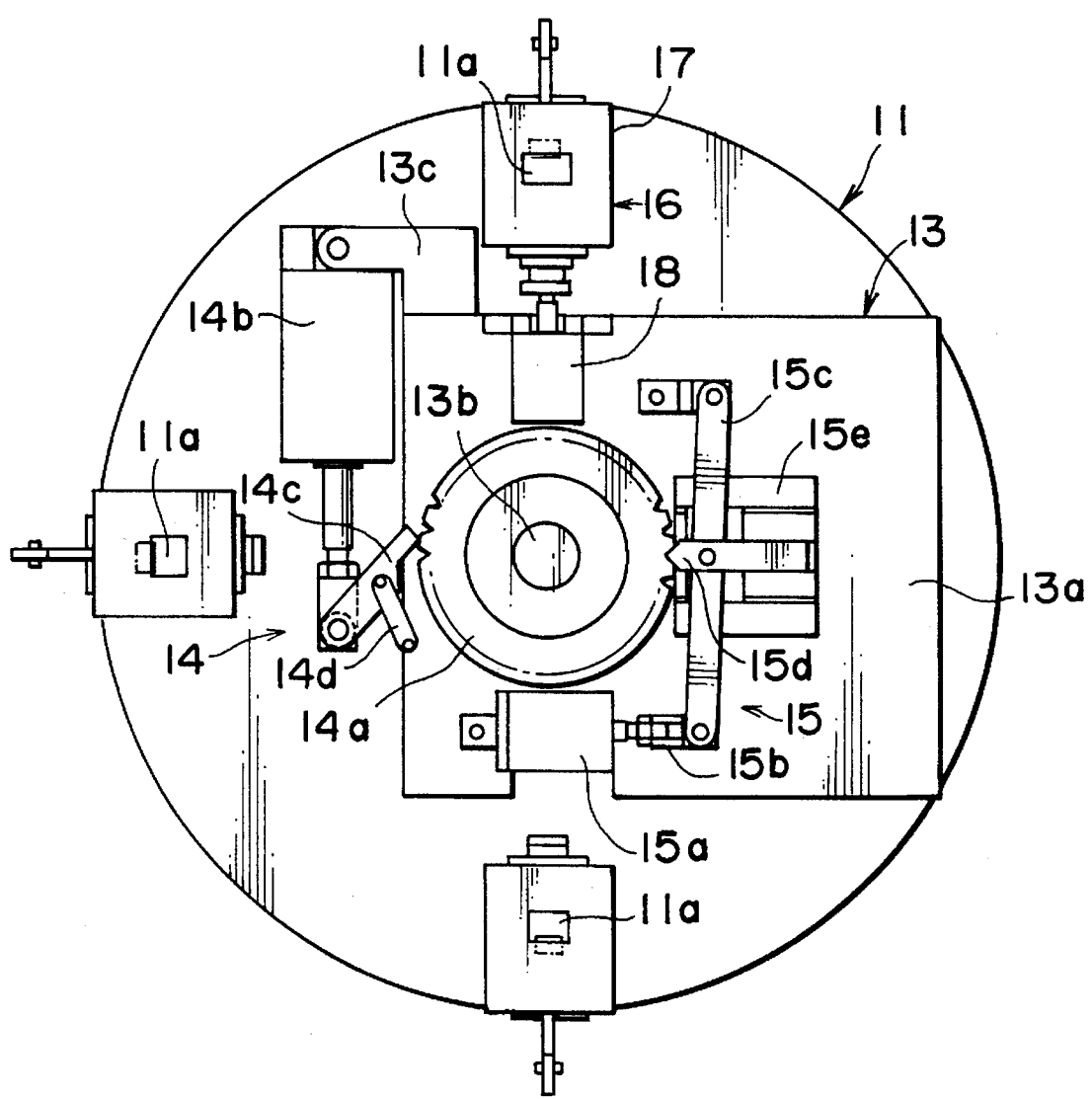
FIG. 2 is a plan view of the backside bottom of a rotating circular plate constituting a part of the apparatus of the present invention.

As shown in FIG. 2, the rotating circular plate 11 has on its backside a support mechanism 13, a rotation drive mechanism 14, an index mechanism: 15 for indexing a rotation angle, and a parts discharge mechanism 16. The support mechanism 13 includes a support table 13a lying in a horizontal plane upwardly spaced by a predetermined distance from the floor level on which the parts feeding apparatus is installed, and a vertical support shaft 13b mounted on the support table 13a via a bearing means (not shown). The vertical support shaft 13b has an upper end fixedly connected to the center of the rotating circular plate 11, with a lower end thereof fixedly connected to the center of a ratchet wheel 14a. A first cylinder actuator 14b is pivotally mounted on a peripheral portion of the support table 13a via a bracket 13c attached to the support table 13a. The first cylinder actuator 14b has a piston rod pivotally connected at its outer end to one end of a ratchet feed pawl 14c. The ratchet feed pawl 14c is pivotally connected at its intermediate portion to one end of a link 14d, the other end of the link 14d being pivotally connected to the support table 13a. The ratchet wheel 14a, first cylinder actuator 14b, ratchet feed pawl 14c and link 14d jointly constitute the rotation drive mechanism 14 for intermittently rotating the rotating circular plate 11.

The index mechanism 15 includes a control portion or unit (not shown) constructed to drive the first cylinder actuator 14b and including inside a counter (not shown) for counting the number of operations of the first cylinder actuator 14b, a second cylinder actuator 15a adapted to be operated by a signal from the control unit, and a locking and releasing member 15b driven by the second cylinder actuator 15a.

The locking and releasing member 15b is composed of a rocking lever 15c pivotally connected, at its one end, to the outer end of a piston rod of the second cylinder actuator 15a and, at the other end, to the support table 13a, and a slidable locking pawl 15d pivotally connected to an intermediate portion of the rocking lever 15c. The locking pawl 15d is slidably guided by a guide member 15e such that when the second cylinder actuator 15a is operated to rock or oscillate the rocking lever 15c, the locking pawl 15d moves toward and away from gear teeth on the ratchet wheel 14a to alternatively lock and release the ratchet wheel 14a.

In the illustrated embodiment, the parts discharge mechanism 16 is composed of a plurality of parts supply units 17 associated with the parts supply openings 11a, respectively, and a third cylinder actuator 18 releasably engageable with a slide plate member 16a of each of the parts supply units 17 to slidably reciprocate the slide plate member 16a when a part (bottom end stop) is to be discharged. The parts supply openings 11a arranged in the periphery of the rotating circular plate 11 are formed in the parts supply units 17, respectively. Each of the parts supply units 17 is fitted in a cutout engagement recess 11b (FIG. 6) formed in the rotating circular plate 11 at a position corresponding to the position of a corresponding one of the parts supply openings 11a and is fixed to the rotating circular plate 11 by a suitable fixing means such as screws.

Figure 3:
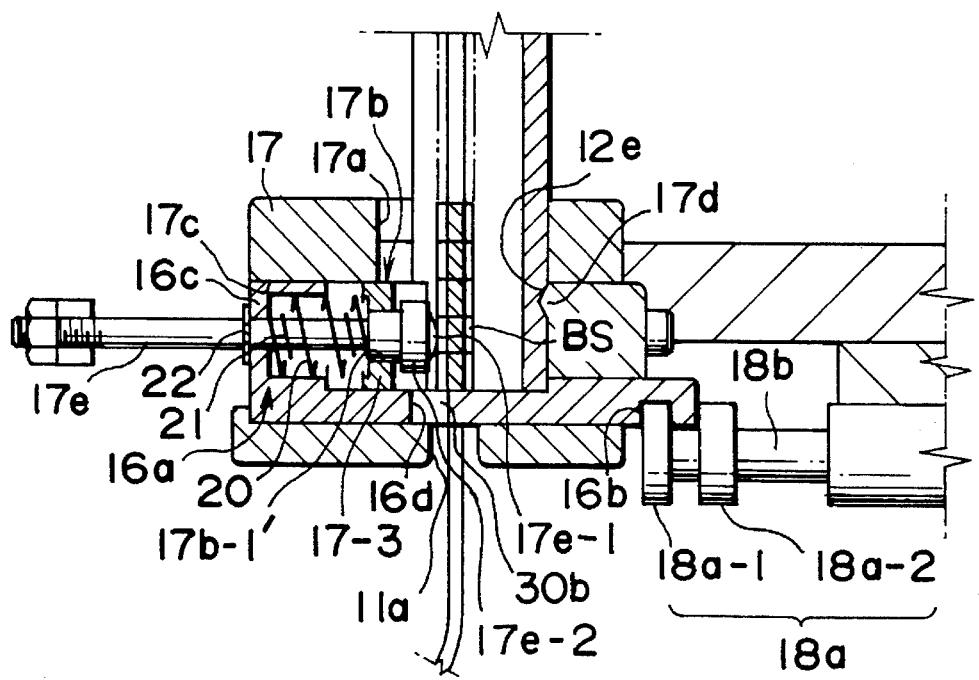
FIG. 3 is a vertical cross-sectional view showing a main portion of a parts supply unit including a parts supply opening and a parts stocking cassette fitted in the parts supply opening.

The third cylinders actuator 18, as shown in FIGS. 2 and 3, is fixed at a predetermined position on the support table 13a and has an engagement portion 18a formed on the outer end of the piston rod in the form of a pair of annular flanges 18a-1 and 18a-2 lockingly engageable with an end portion of each slide plate member 16a, with the flange 18a-1 fitted in an engagement groove 16b formed in an inner end portion of the slide plate member 16a.

Figure 6:
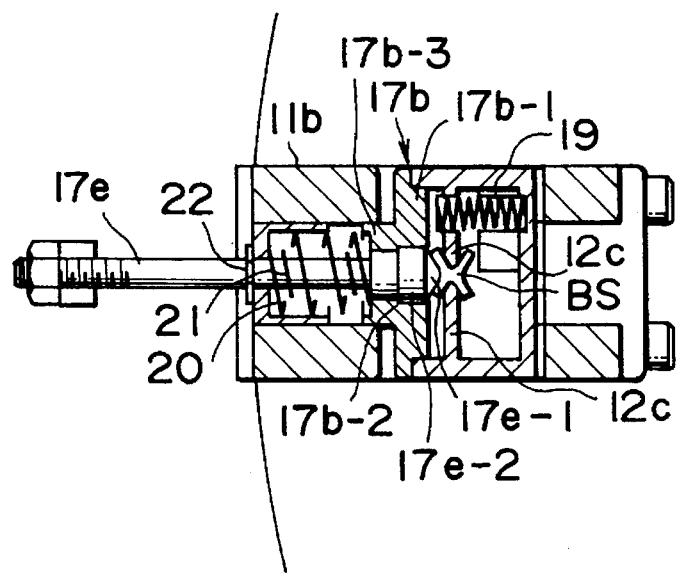
FIG. 6 is a horizontal cross-sectional view of the portion shown in FIG. 3.

The parts supply unit 17, as shown in FIGS. 2, 3 and 6, has a vertical cassette insertion hole 17a for firmly receiving therein a lower end of the corresponding parts stocking cassette 12, and a horizontal guide hole 17c extending perpendicularly to, and communicating with, the cassette insertion hole 17a for slidably receiving therein a cassette-holding and stopper-releasing member 17b and a portion of the slide plate member 16a. The guide hole 17c extends perpendicularly across the cassette insertion hole 17a so that the slide plate member 16a is slidable in a radial direction of the rotating circular plate 11 within a predetermined distance. A locking projection 17d is located on the rear side (right side in FIG. 3) of the cassette insertion hole 17a and projects into the cassette insertion hole 17a for locking the parts stocking cassette 12 in position against displacement when the lower end portion of the cassette 12 is inserted in the cassette insertion hole 17a.

Figure 7:
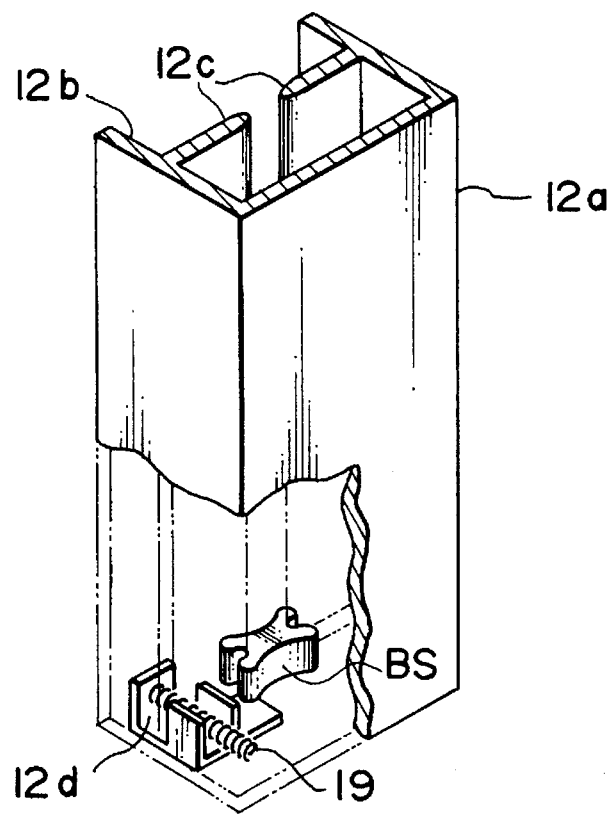
FIG. 7 is a fragmentary perspective view, with parts cutaway for clarity, of the parts stocking cassette.
Figure 8A:
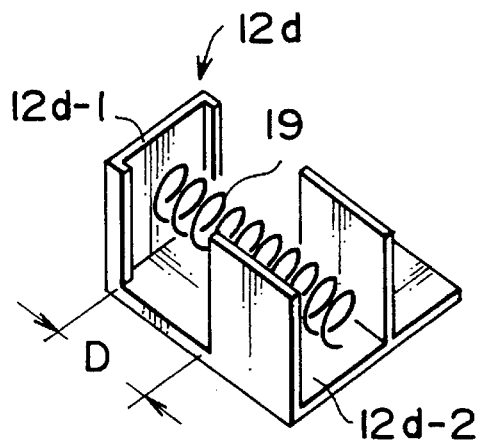
FIG. 8(a) is a perspective view of a gate member used for opening and closing a parts discharge opening of the parts stocking cassette.

The parts stocking cassette 12, as shown in FIG. 7, is composed of an elongated body 12a having a generally C-shaped transverse cross section, a pair of confronting parts guide rails 12c formed integrally with and projecting from confronting inner side surfaces 12b of the C-shaped body 12a, and a parts stopper 12d attached as a gate member to one end (lower end) of the guided rails 12c for opening and closing a discharge opening at the lower end of the cassette 12. The parts stopper 12d has a structure best shown in FIG. 8(a) and is composed of a spring retainer 12d-1 extending parallel to the guide rails 12c, and a parts stopping portion 12d-2 having a substantially F-shaped cross section and extending perpendicularly to the spring retainer 12d-1. The parts stopping portion 12d-2 and the spring retainer 12d-1 are formed integrally with each other and spaced from one another by a predetermined space of distance D. A part of the parts stopping portion 12d-2 extends transversely to the parts guide rails 12c and has a length long enough to support a portion of the part (bottom end stop BS) from the bottom. The parts stopper 12d is slidably mounted in the parts stocking cassette 12 via a slide guide means (not shown), with the parts guide rails 12c disposed between the spring retainer 12d-1 and the parts stopping portion 12d-2. The parts stopper 12d has a compression coil spring 19 disposed between two opposed vertical walls of the F-shaped parts stopping portion 12d-2, with opposite ends of the compression coil spring 19 being retained by the spring retainer 12d-1 and the body 12a of the parts stocking cassette 12. In the illustrated embodiment, the body 12a of the parts stocking cassette 12 has a locking groove 12e formed in an outer surface of a rear wall (right side in FIG. 3) and located near the lower end of, the body 12a for interlocking engagement with the locking projection 17d.

Figure 8B:
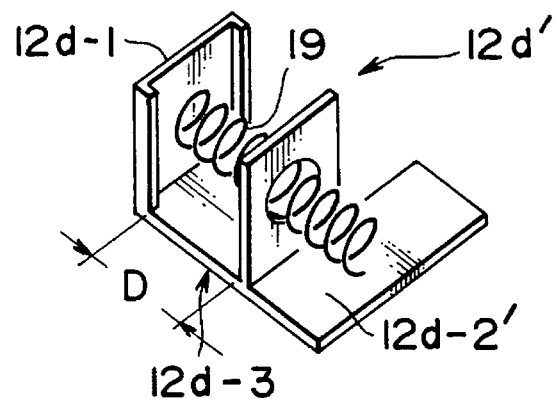
FIG. 8(b) is a view similar to FIG. 7, showing a modified gate member.

FIG. 8(b) shows a modified form of the parts stopper 12d. The modified parts stopper 12d' includes a stopper body 12d-3 having a substantially F-shaped cross section and including a spring retainer 12d-1 and a parts stopping portion 12d-2' spaced from the spring retainer 12d-1 by a distance D and partly projecting laterally outwardly from the stopper body 12d-3.

The slide plate member 16a, as shown in FIGS. 3 and 6, has an arcuate engagement groove 16b extending concentrically with an axis of rotation of the rotating circular plate 11 and formed in the backside of an inner end portion of the slide plate member 16a which is located on the interior side of the rotating circular plate 11, and a cup-shaped lug 16c integrally formed on an upper surface of an outer end portion of the slide plate member 16a which is located adjacent to the outer peripheral edge of the rotating circular plate 11. The cup-shaped lug 16c is slidably received in the guide hole 17c in the parts supply unit 17 and opens toward the inner end of the slide plate member 16a. The slide plate member 16a has in its intermediate portion a parts discharge opening 16d for the passage therethrough of the parts (bottom end stops BS).

The cassette-holding and stopper-releasing member 17b is composed of a generally T-shaped block 17b-1, as shown in FIG. 6, and has a horizontal through-hole 17b-1' extending centrally through the T-shaped block 17b-1 for receiving therein an actuating rod 17e. The through-hole 17b-1' is a stepped hole and has a step 17b-2 (FIG. 6) located at an intermediate portion thereof.

The actuating rod 17e has an enlarged presser portion 17e-1 formed at one end thereof and having a conical projection. The presser portion 17e-1 has a base portion 17e-2 having an outside diameter larger than that of a body of the actuating rod 17e. The large-diameter base portion 17e-2 is engageable with the step 17b-2 of the through-hole 17b-1' so that a movement of the actuating rod 17e in one direction (leftward direction in FIGS. 3 and 6) is limited when the large-diameter base portion 17e-2 is seated on the step 17b-2. The actuating rod 17e is inserted through the through-hole 17b-1' and also extends through the center of cup-shaped lug 16c of the slide plate member 16a. A first compression coil spring 20 is received in the cup-shaped lug 16c and acts between an inner bottom surface of the cup-shaped lug 16c and an end face of a central projection 17b-3 of the T-shaped block 17b-1. A second compression coil spring 21 is disposed around the body of the actuating rod 17e and acts between the inner bottom surface of the cup-shaped lug 16c and an end face of the large-diameter base portion 17e-2. To that portion of the actuating rod 17e projecting from the outside surface of the cupshaped lug 16c is attached a stop ring 22 to limit one end of a range of distance within which the central projection 17b-3 of the T-shaped block 17b-1 is slidably movable in the guide hole 17c.

When a lower end portion of each of the parts stocking cassettes 12 is inserted into the cassette insertion hole 17a of a corresponding one of the parts supply units 17, the cassette 12 forcibly displaces the T-shaped block 17b-1 of the cassette-holding and stopper-releasing member 17b and the presser portion 17e-1 of the actuating rod 17e in a radially outward direction of the rotating circular plate 11 against the forces of the first and second compression coil springs 20, 21, respectively. When the lower end of the cassette 12 abuts on the upper surface of the slide plate member 16a, the locking projection 17d projecting from the rear wall of the cassette insertion hole 17a into the cassette insertion hole 17a snaps with the locking groove 12e formed at the lower end portion of the cassette 12. In this instance, opposite end portions of a transverse head of the T-shaped block 17b-1 force the cassette 12 against the rear wall of the cassette insertion hole 17a under the force of the first compression coil spring 20, and at the same time the conical projection on the presser portion 17e-1 forces from the front side one of the bottom end stops BS stacked in the cassette 12 along the guide rails 12c, against the guide rails 12c under the force of the second compression coil spring 21. In the illustrated embodiment, the bottom end stop BS which is forced by the presser portion 17e-1 is a second lowermost bottom end stop which is located next to the lowermost bottom end stop BS.

At the same time, the parts stopper 12d slidably mounted in the lower end portion of the cassette 12 is displaced by the T-shaped block 17b-1 toward the rear wall of the cassette 12 against the force of the compression coil spring 19 such that the parts stopper 12d is shifted from a closing position in which the parts stopping portion 12d-2 of the parts stopper 12d is disposed immediately below the lowermost bottom end stop BS to support thereon the lowermost bottom end stops BS, to an opening position in which the parts stopping portion 12d-2 is displaced laterally outwardly from the lowermost bottom end stop BS. Thus, before the parts stocking cassette 12 is set in the corresponding cassette insertion hole 17a, the bottom end stops BS stacked in the cassette 12 are prevented by the parts stopper 12d from falling down from the cassette 12. And upon setting of the cassette 12 in the cassette insertion hole 17a, a stopping function peculiar to the parts stopper 12d is canceled out so that the bottom end stops BS are allowed to fall by gravity down from the cassette 12 along the guide rails 12c.

According to the illustrated embodiment, a cassette 12' which is used in combination with a parts feeder 23 having substantially the same construction as the parts stocking cassettes 12 is set in one of the cassette insertion holes 17a, as shown in FIG. 1. The parts feeder 23 has a parts feed chute 23a serving as a parts guide member and is disposed such that an outlet opening of the parts feed chute 23a is located above an upper end of the parts delivery chute 30a with the cassette 12' interposed between the parts feed chute 23a and the pats delivery chute 30a. The parts feeder 23 may be of the conventional type, and in the illustrated embodiment an electromagnetic vibration parts feeder is employed. With the parts feeder 23 thus provided, the parts feeding apparatus is able to be applied for the feeding of parts in large lots. When the parts supply opening 11a which is fitted with the cassette 12' comes to communicate with an inlet opening 30b of the parts delivery chute 30a, the upper end of the cassette 12' and a lower end of the parts feed chute 23a are connected together by-a suitable coupling means (not shown).

The parts feeding apparatus of the foregoing construction operates as follows. At first, the type of bottom end stops BS to be fed in the next cycle of operation is determined based on production control data stored in the non-illustrated control unit. When the type of the bottom end stops BS is determined, the control unit supplies a signal to the first cylinder actuator 14b for activating the first cylinder actuator 14b repeatedly. In response to repeated activation of the first cylinder actuator 14b, the ratchet feed pawl 14c is repeatedly driven or oscillated to rotate the ratchet wheel 14a intermittently tooth by tooth in one direction, so that the rotating circular plate 11 will rotate. During that time, the number of operation of the first cylinder actuator 14b is counted by the counter contained in the control unit, and the operation of the first cylinder actuator 14b is stopped when a parts supply opening 11a, which is fitted with the parts stocking cassette 12 storing therein the bottom end stops BS of the determined type, comes to communicate with the inlet opening 30b of the parts delivery chute 30a. When the first cylinder actuator 14b is stopped, the second cylinder actuator 15a of the index mechanism 15 is activated to move the slidable locking pawl 15d into interlocking engagement with the ratchet wheel 14a via a rocking motion of the rocking lever 15c. Thus, the rotating circular plate 11 is locked in position against rotation, with the selected one parts supply opening 11a held in communication with the inlet opening 30b of the parts delivery chute 30a.

Figure 4:
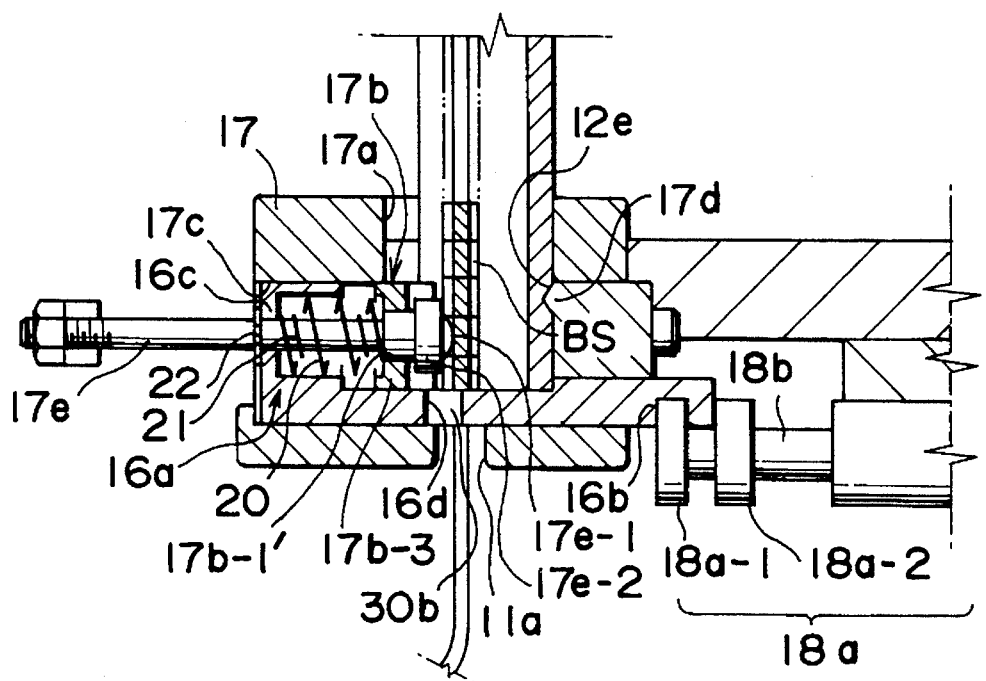
FIG. 4 is a view similar to FIG. 3, showing a slide member of the parts supply unit as it is in the course of its sliding motion.
Figure 5:
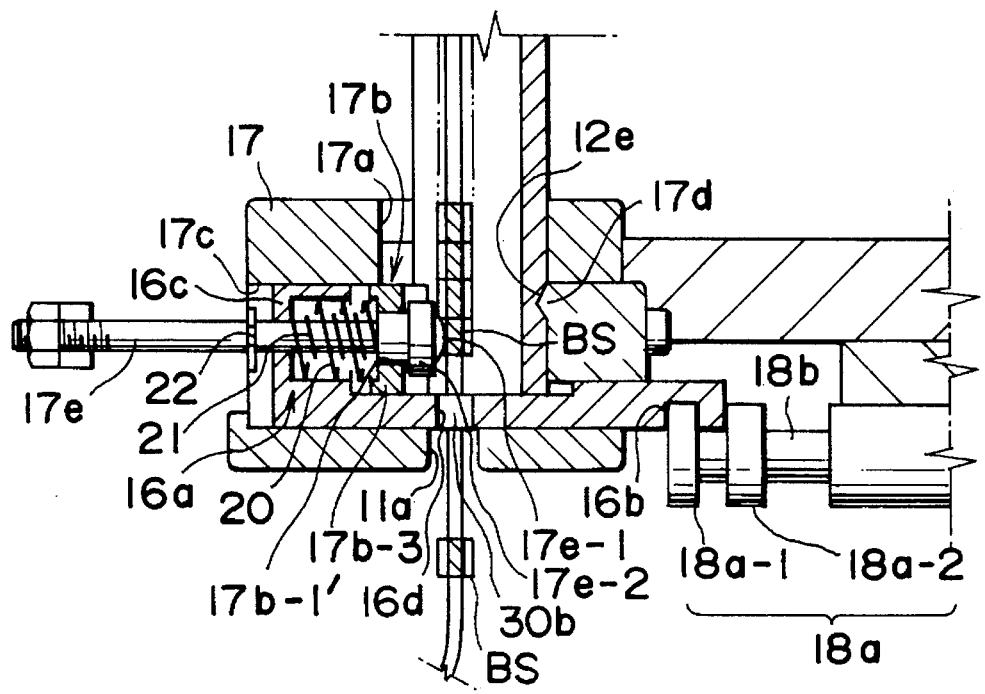
FIG. 5 is a view similar to FIG. 3, showing a condition in which a bottom end stop is discharged from the parts supply opening.

As the rotating circular plate 11 angularly moves or turns through a predetermined angular distance in order to position the selected parts supply opening 11a relative to the parts delivery chute 30a in the manner described above, the arcuate engagement groove 16b formed in the inner end portion of the slide plate member 16a is automatically brought into interlocking engagement with the engagement portion 18a of the third cylinder actuator 18 fixedly mounted on a portion of the support table 13a, as shown in FIG. 3. When the engagement groove 16b and the engagement portion 18a of the piston rod 18b are engaged together, the third cylinder actuator 18 is activated to contract its piston rod 18b by a predetermined distance, as shown in FIGS. 4 and 5. When the piston rod 18b is fully contracted as shown in FIG. 5, the parts discharge opening 16d formed at the intermediate portion of the slide plate member 16a is located in a position directly below the lowermost bottom end stop BS and aligned with the parts supply opening 11a formed in the parts supply unit 17. In this instance, since the second compression coil spring 21 acting between the inner bottom surface of the cup-shaped lug 16c and the end face of the large-diameter base portion 17e-2 is compressed, the conical projection on the presser portion 17e-1 of the actuating rod 17e forces the second lowermost bottom end stop BS strongly against the guide rails 12c by the force of the second compression coil spring 21. As a result, the second lowermost bottom end stop BS and all of the bottom end stops BS stacked above the second lowermost bottom end stop BS are prevented from falling down along the guide rails 12c. On the other hand, the lowermost bottom end stop BS is allowed to fall by gravity down from the parts discharge opening 16d. Since the inlet opening 30b of the parts delivery chute 30a is held in communicating with the parts supply opening 11a, the lowermost bottom end stop BS is subsequently delivered by the parts delivery chute 30a to a subsequent processing station formed in a bottom end stop applying unit AP (FIG. 1).

Thereafter, when a predetermined period of time expires, the third cylinder actuator 18 is driven to extend its piston rod 18b. With this extending movement of the piston rod 18b, the slide plate member 16a is returned to its initial position shown in FIG. 3, and at the same time the pressure applied from the conical projection on the pressure portion 17e-1 to the bottom end stop BS is released, so that the same bottom end stop BS and all of the bottom end stops BS stacked thereon are allowed to fall down along the guide rails 12c. In this instance, since the slide plate member 16a is disposed in its initial position, the parts discharge opening 16d in the slide plate member 16a is displaced out of alignment with the stacked bottom end stops BS. The bottom end stops BS are therefore supported in stacked condition on the upper surface of the slide plate member 16a and retained in the parts stocking cassette 12. Thus, by repeating the foregoing cycle of operation at predetermined time intervals, the bottom end stops BS stacked in the parts stocking cassette 12 are supplied successively at predetermined time intervals to the parts delivery chute 30a and subsequently delivered from the parts delivery chute 30a to the subsequent processing station.

When the bottom end stops BS have been fed in a certain quantity or lot which is preset in the non-illustrated control unit, the rotating circular plate 11 is rotated through a predetermined angle until a parts stocking cassette 12 holding therein a stack of bottom end stops BS of a different type to be fed in the next cycle of operation is disposed directly above the inlet opening 30b of the parts delivery chute 30a. Subsequently, the foregoing sequence of operation is repeated to feed the bottom end stops BS successively at predetermined time intervals to the subsequent processing station.

As described above, the parts feeding apparatus of the present invention includes a plurality of parts stocking cassettes holding therein rows of parts of different types, respectively. The cassettes are removably attached to a plurality of parts supply openings arranged at predetermined angular intervals along the peripheral edge of a rotating circular plate. The rotation angle of the rotating circular plate is indexed so that a selected one of the parts supply openings and the cassette attached thereto are positioned relative to the inlet opening of a parts delivery chute. Then, a discharge opening at the lower end of the cassette is alternatively opened and closed at predetermined time intervals by a reciprocating slide plate member. The parts feeding apparatus thus constructed is compact in construction. When the parts stocking cassettes are arranged in the order determined according to a predetermined production control system or procedure, the bottom end stops to be fed are automatically and smoothly changed or switched from one type to another. The parts feeding apparatus is, therefore, readily adaptable to the production of a wide variety of articles to be manufactured in small lots. On the other hand, when one of the parts stocking cassettes is replaced with a cassette used in combination with a parts feeder, the parts feeding apparatus is also adaptable to the production of articles to be manufactured in large lots.

Obviously, various minor changes and modifications of the present invention are possible in the light of the above teaching. It is therefore to be understood that within the scope of the appended claims the invention may be practiced otherwise than as specifically described.

What is claimed is:

1. A parts feeding apparatus for selectively feeding parts of different types to a subsequent processing station, comprising:

(a) a parts inventory unit including a rotating circular plate having a plurality of parts supply openings arranged on the same circumference, and a plurality of removable and remotely refillable parts stocking cassettes storing respectively therein rows of parts of different types and removably attached to corresponding ones of said parts supply openings in such a manner that the parts in each of said parts stocking cassettes can be discharged from the cassette successively one at a time, said circular plate being intermittently rotatable in a horizontal plane to selectively index said parts supply openings; and (b) a chute unit including a parts delivery chute mounted fixedly and having an inlet opening facing a portion of said circumference so that said parts supply openings in said rotating circular plate can selectively come to communicate with said inlet opening of said parts delivery chute in response to intermittent rotation of said rotating circular plate.

2. A parts feeding apparatus for selectively feeding parts of different types to a subsequent processing station, comprising:

(a) a parts inventory unit including a rotating circular plate having a plurality of parts supply openings arranged on the same circumference, and a plurality of parts stocking cassettes storing respectively therein rows of parts of different types and removably attached to corresponding ones of said parts supply openings in such a manner that the parts in each of said parts stocking cassettes can be discharged from the cassette successively one at a time, said circular plate being intermittently rotatable in a horizontal plane to selectively index said parts supply openings; and (b) a chute unit including a parts delivery chute mounted fixedly and having an inlet opening facing a portion of said circumference so that said parts supply openings in said rotating circular plate can selectively come to communicate with said inlet opening of said parts deliver chute in response to intermittent rotation of said rotating circular plate;

wherein said parts inventory unit further includes a parts feeder having a discharge guide member, and a second cassette for use with said parts feeder, said second cassette being fitted in at least one of said parts supply openings and connectable with said discharge guide member of said parts feeder.

3. A parts feeding apparatus for selectively feeding parts of different types to a subsequent processing station, comprising:

(a) a parts inventory unit including a rotating circular plate having a plurality of parts supply openings arranged on the same circumference, and a plurality of parts stocking cassettes storing respectively therein rows of parts of different types and removably attached to corresponding ones of said parts supply openings in such a manner that the parts in each of said parts stocking cassettes can be discharged from the cassette successively one at a time, said circular plate being intermittently rotatable in a horizontal plane to selectively index said parts supply openings; and (b) a chute unit including a parts delivery chute mounted fixedly and having an inlet opening facing a portion of said circumference so that said parts supply openings in said rotating circular plate can selectively come to communicate with said inlet opening of said parts delivery chute in response to intermittent rotation of said rotating circular plate;

wherein said parts inventory unit further includes a slide member slidably disposed over each of said parts supply openings and normally urged in a first direction to close the corresponding parts supply opening, said slide member having a parts discharge opening normally held out of alignment with said parts supply opening, said parts discharge opening in said slide member being aligned with and hence communicating with said parts supply opening when said slide member is displaced in a second direction opposite to said first direction.

4. A parts feeding apparatus according to claim 3, wherein said parts inventory unit further includes a cylinder actuator fixedly mounted for reciprocating said slide member in said first and second directions, said cylinder actuator having a piston rod and an engagement portion provided on an outer end of said piston rod, and wherein said slide member has an arcuate engagement groove extending concentrically with an axis of rotation of said rotating circular plate, said engagement groove being automatically brought into interlocking engagement with said engagement portion of said cylinder actuator When said rotating circular plate rotates intermittently.

5. A parts feeding apparatus for selectively feeding parts of different types to a subsequent processing station, comprising:

(a) a parts inventory unit including a rotating circular plate having a plurality of parts supply openings arranged on the same circumference, and a plurality of parts stocking cassettes storing respectively therein rows of parts of different types and removably attached to corresponding ones of said parts supply openings in such a manner that the parts in each of said parts stocking cassettes can be discharged from the cassette successively one at a time, said circular plate being intermittently rotatable in a horizontal plane to selectively index said parts supply openings; and (b) a chute unit including a parts delivery chute mounted fixedly and having an inlet opening facing a portion of said circumference so that said parts supply openings in said rotating circular plate can selectively come to communicate with said inlet opening of said parts delivery chute in response to intermittent rotation of said rotating circular plate;

wherein each of said parts stocking cassettes is composed of a hollow tubular member having a discharge opening at one end and including a guide portion extending longitudinally of said tubular member for guiding therealong the parts in stacking condition, and a gate member movably mounted in said tubular member adjacent to said discharge opening for repeatably opening and closing said discharge opening of said tubular member.

* * * * *